United States Patent Office 3,632,834
Patented Jan. 4, 1972

3,632,834
PROCESS FOR PREPARING TRICHLOROTRIFLU-OROETHANE AND DICHLOROTETRAFLUORO-ETHANE
Frank Joseph Christoph, Jr., Elkton, Md., assignor to E. I. du Pont de Nemours and Company, Wilmington, Del.
No Drawing. Continuation-in-part of application Ser. No. 700,683, Jan. 24, 1968. This application Oct. 23, 1968, Ser. No. 770,125
Int. Cl. C07c 17/20, 19/08
U.S. Cl. 260—653.7                              11 Claims

ABSTRACT OF THE DISCLOSURE

The vapor phase preparation of 1,1,2-trichloro-1,2,2-trifluoroethane and 1,2-dichloro-1,1,2,2-tetrafluoroethane by reacting a less highly fluorinated perhaloethane with hydrogen fluoride in the presence of chromium trifluoride. One reactant is perchloroethane which can be prepared in situ from tetrachloroethylene and chlorine. The presence of undesirable isomers in the products of the process is reduced.

CROSS REFERENCE TO RELATED APPLICATION

This application is a continuation-in-part of application Ser. No. 700,683, filed Jan. 24, 1968, now abandoned.

BACKGROUND OF THE INVENTION (1) Field of the invention

This invention relates to the preparation of 1,1,2-trichloro-1,2,2-trifluoroethane and 1,2-dichloro-1,1,2,2-tetrafluoroethane from less highly fluorinated perhaloethanes in the presence of chromium trifluoride.

(2) Description of the prior art

The manufacture of both 1,1,2-trichloro-1,2,2-trifluoroethane and 1,2-dichloro-1,1,2,2-tetrafluoroethane by reaction of tetrachloroethylene with chlorine and hydrogen fluoride in a liquid phase system using antimony halide catalyst is old, well known and widely used commercially. Practically all of these two products manufactured today is obtained by this process. The antimony catalyzed liquid phase process has the disadvantage, however, of being sensitive to catalyst deactivation by impurities in the tetrachloroethylene and hydrogen fluoride, particularly the former. Hence it is necessary to purify the reactants, adding to the expense of the process.

Vapor phase reaction of chlorinated hydrocarbons with hydrogen fluoride at elevated temperatures over non-volatile metal halide catalysts is also well known, including reaction of tetrachloroethylene, chlorine and hydrogen fluoride. Such processes are generally not particularly sensitive to impurities in the starting materials insofar as catalyst deactivation is concerned. However, the relative amounts of the isomeric byproducts 1,1,1-trichloro-2,2,2-trifluoroethane and 1,1-dichloro-1,2,2,2-tetrafluoroethane produced by the vapor phase processes are higher than in the liquid phase processes mentioned above. The amount of the isomer 1,1,1-trichloro-2,2,2-trifluoroethane produced during the preparation of 1,1,2-trichloro-1,2,2-trifluoroethane and the amount of the isomer 1,1-dichloro-1,2,2,2-tetrafluoroethane produced during the preparation of 1,2-dichloro-1,1,2,2-tetrafluoroethane is undesirable because these two isomers, being ones where the chlorine atoms are concentrated on a single carbon atom, are more corrosive toward metals, are more hydrolytically unstable and are otherwise undesirable. Hence, while the vapor phase process tends to overcome the catalyst deactivation problem, it introduces a new problem created by the presence of the undesirable isomers. Indeed, it has been found that if 1,1,2-trichloro-1,2,2-trifluoroethane contains more than about 2% 1,1,1-trichloro-2,2,2-trifluoroethane or if 1,2-dichloro-1,1,2,2-tetrafluoroethane contains more than about 15% 1,1-dichloro-1,2,2,2-tetrafluoroethane, they are no longer desirable for many commercial applications.

Since the boiling points of the two isomeric trichlorotrifluoroethanes and dichlorotetrafluoroethanes each differ by only a few tenths of a degree C. at most, separation on a commercial scale is a practical impossibility. It has now been found, however, that a specific type of catalyst, when used in the vapor phase reaction, does not cause formation of undesirably high amounts of the undesired isomers. This type of catalyst is chromium trifluoride, $CrF_3$, as further defined below.

It is therefore an object of this invention to provide a process which overcomes both the problem of catalyst deactivation and the problem of undesirable product isomers. These and other objectives are attained by the present invention as seen below.

SUMMARY OF THE INVENTION

Process for preparing compounds of the formula $CF_2ClCFXCl$ wherein X is fluorine or chlorine which comprises reacting substantially anhydrous hydrogen fluoride with a compound of the formula $C_2Cl_aF_b$ wherein $b$ is a cardinal number of 0 through 3 and is less than the total number of fluorine atoms in $CF_2ClCFXCl$, the sum of $a$ and $b$ is six, and the number of fluorine atoms in $C_2Cl_aF_b$ attached to the same carbon atom is no greater than two, at a temperature of between about 200° C. and 450° C. and in the presence of chromium trifluoride.

DESCRIPTION OF THE INVENTION

The starting materials for the process of this invention are compounds of the formula $C_2Cl_aF_b$ wherein $b$ is from zero to three and is less than the number of fluorines in the desired product of $CF_2ClCFXCl$, the sum of $a$ and $b$ is six and no more than two of the fluorines may be attached to a single carbon atom. The compounds $C_2Cl_aF_b$ are represented by hexachloroethane, fluoropentachloroethane, difluorotetrachloroethane (both 1,1 and 1,2-difluoro-) and 1,1,2-trichlorotrifluoroethane. The latter is used, of course, to manufacture only 1,2-dichlorotetrafluoroethane. The others give $CF_2ClCFXCl$ where X is chlorine or fluorine. These starting materials may be taken from any convenient source but they are particularly conveniently obtained by the processes described hereinbelow.

The hexachloroethane reactant can be conveniently prepared in situ by using a mixture of tetrachloroethylene and chlorine as the feedstock. Two reactions take place in this instance, one being the addition of the chlorine to the unsaturated reactant, and the second being the replacement of chlorine by fluorine. When the other reactants are used, only replacement of chlorine by fluorine occurs. In the mixtures of chlorine and tetrachloroethylene, at least 0.5 mole of chlorine per mole of tetrachloroethylene should be used if convenient conversion levels are to be attained. Large excesses, e.g., up to twenty moles, may be used. Stoichiometry requires one mole; however, a slight excess is preferred.

Again, to obtain reasonable conversion levels, at least 0.5 mole of hydrogen fluoride per mole of chlorine to be replaced should be provided. Large excesses of hydrogen fluoride may be used, e.g., up to 20 moles, since the process does not readily form products containing over four fluorine atoms. The preferred conditions closely approximate stoichiometry, a small excess over one mole of hydrogen fluoride per atom mole of chlorine to be replaced. Generally, the excess of hydrogen fluoride is in the range of 2-5 moles.

The catalyst employed in the process of this invention is chromium trifluoride itself. The chromium oxyfluorides or basic chromium fluorides, such as those described by Ruh and Davis in U.S. Pat. 2,745,886, are not equivalent to chromium trifluoride and are not useful in the process of this invention.

The chromium trifluoride catalysts may be used in bulk form or supported on a specified carbon support. The bulk form can be prepared by partial dehydration of a hydrous chromium chloride such as $CrCl_3 \cdot 6H_2O$ to a lower hydrate followed by treatment with HF at elevated temperatures, e.g., greater than 200° C. (with about 400° C. being preferred), which first converts the $CrCl_3$ hydrate to the anhydrous form, then replaces chlorine with fluorine to form $CrF_3$.

The chromium trifluoride-on-carbon catalysts of this invention can be prepared by treating the carbon support with an aqueous solution of chromium trichloride hexahydrate ($CrCl_3 \cdot 6H_2O$) until the desired amount of the chromium salt is absorbed. The solids are then dried to evaporate water, e.g., at about 110° C. The superficially dry solids are then further dried at 400° C. with gaseous hydrogen fluoride. X-ray and electron diffraction studies of catalysts produced in this manner indicate the chromium to be in the form of chromium trifluoride, free of detectable oxygen. If, instead of $CrCl_3 \cdot 6H_2O$, one were to start with a hydrous chromium trifluoride such as $CrF_3 \cdot 3H_2O$ or $CrF_3 \cdot 4H_2O$ in the preparation of catalyst, the resulting catalyst contains predominantly a chromium oxyfluoride.

The nature of the activated carbon support used to prepare these catalysts is important to obtain optimum results. The carbon supports derived from vegetable (preferably wood from the trunks or branches), petroleum and coal sources give useful catalysts, while carbon supports derived from animal sources are generally not useful. Some particularly useful carbon supports are petroleum carbon derived from petroleum coke (e.g., "Columbia CXC"), wood charcoals such as "Norit" which is derived from Florida pine, and carbon such as coke, derived from bituminous coal (e.g., Pittsburgh Activated Carbon Co., type BPL).

The catalytic activity of chromium trifluoride-on-carbon fluorine exchange catalysts used in this invention is affected in varying degrees by the presence of water soluble alkali metal salts which often appear as impurities in charcoal or other carbon supports of vegetable origin. In some instances e.g., carbon supports derived from coconut shells, the alkali metal salts interfere to such an extent that the support is rendered commercially unacceptable in catalyst preparation. The predominant alkali metal impurity is usually potassium although significant amounts of sodium salts may also appear.

It has now been discovered that such alkali metal salt impurities can be removed from the charcoal and carbon supports of vegetable origin and that the catalytic activity of the chromium trifluoride-on-carbon fluorine exchange catalysts can thus be facilitated by washing said charcoal and carbon supports with water. Those supports which contain significant amounts of alkali metals usually do so to the extent of two percent by weight or more. If such supports are washed with water, until the alkali metal content is about 0.1 to 0.3% by weight or less, the resulting washed charcoal or carbon does not interfere with the catalytic activity of the chromium trifluoride supported thereon as can be seen in Example 13.

While normally, fresh flowing water is utilized in the washing, pure water is not necessary but may in fact be diluted with water miscible organic solvents such as alcohols, ketones, methanol, ethanol, tetrahydrofuran, acetone, dimethylformamide and the like without adverse effect. Likewise the water may contain strong mineral acids. Ambient water temperatures are generally useful but heating the wash water to higher than ambient temperature accelerates the process of dissolving the alkali metal salts from the charcoal or carbon support.

The carbon-supported catalyst should contain at least 1% by weight $CrF_3$. Any larger amount may be used, 10%-20% being preferred.

The reaction temperature may vary from about 200° C., below which the reaction is inconveniently slow, to about 450° C., above which the degree of formation of the undesired isomeric products becomes intolerably large.

The reaction pressure is not critical and may vary from below atmospheric pressure to well above atmospheric pressure. The preferred temperatures and contact times vary somewhat with the pressure being used. At about one atmosphere, the preferred temperature range is 300°–325° C. with contact times of 0.5 to 30 sec., more preferably from five to ten seconds. At higher pressures, e.g., 15 to 20 atmospheres, the preferred temperature range is 350°–400° C. with contact times of 40 to 120 seconds. The most preferred set of conditions are 18 atmospheres (250 p.s.i.g.) and 350°–400° C. Unexpectedly, higher pressures require longer contact times to obtain equivalent conversions. At the same time, the formation of the undesired isomers appears to be slower at higher pressures.

The only limitation on pressure in the system is that it should not be sufficiently high to cause reactants to condense in the system. The critical temperatures of tetrachloroethylene, hexachloroethane and some of the other intermediate products are within the reaction temperature range specified above; hence, it would be possible, particularly at the lower end of the temperature range, to exceed the dew point of some of the constituents of the reaction mixture if pressures are sufficiently high.

The process is carried out in any convenient type of reaction system wherein the gaseous reactants can be brought into contact with the solid catalyst at elevated temperatures. A convenient type of reactor consists of a vertical reactor fabricated from an inert material of construction such as steel, stainless steel, nickel, "Inconel," "Hastelloy" or "Monel" alloys, containing a bed of the catalyst therein. Preferably the reactants are premixed before entering the reactor. A preheater may be optionally used if so desired.

The reaction products are separated in the usual manner for products of this type, e.g. fractional distillation, either alone or in combination with scrubbing operations and the like. A typical procedure is described by Benning in U.S. Pat. 2,478,362. All acids and excess chlorine can be removed by scrubbing if desired; recycle of unreacted or incompletely converted materials, while desirable commercially, is not necessary or an integral part of this invention.

When the reactant is $C_2Cl_aF_b$, it may be a relatively pure single species, e.g. $C_2Cl_6$, $C_2FCl_5$, $C_2F_2Cl_4$ or $C_2F_3Cl_3$, or a mixture of two, three or four of these materials. When tetrachloroethylene is used, it may be a pure product or a crude form obtained directly by chlorination of ethylene with a small excess of chlorine. Such crude materials may contain small but variable amounts of trichloroethylene, hexachloroethane, pentachloroethane and others.

The hydrogen fluoride should be at least industrial grade anhydrous hydrogen fluoride but need not be highly purified beyond that.

The following examples illustrate the present invention but are not intended to limit same.

EXAMPLE 1

Preparation of catalyst (A) To a solution of 61.0 g. of chromium trichloride hexahydrate [$CrCl_3 \cdot 6H_2O$] in 200 ml. deionized water was added 100 g. of 6–8 mesh activated petroleum carbon ("Columbia CXC"). The water was evaporated by heating in an oven at 110° C. with frequent stirring during the heating. The resulting solid was transferred to a U-tube reactor made from two pieces of 2.54 x 76.2 cm. "Inconel" pipe, one leg being used as a preheater, the other containing the solid catalyst. The entire reactor was immersed in a molten "Hitec" salt bath (the eutectic mixture of $KNO_3$, $NaNO_3$ and $NaNO_2$) at 400° C. Nitrogen was passed through the solid catalyst, then HF was added at the rate of 13.2 g./hr. for four hours.

(B) In the same manner as above, a 7.4% $CrF_3$ on carbon catalyst was prepared using about 18 g. $CrCl_3 \cdot 6H_2O$ and 100 g. carbon.

(C) In the same manner as above, 42.8 g. $CrCl_3 \cdot 6H_2O$ was deposited on 67 g. of activated charcoal from pine (Norit) of 4–14 mesh. The dry solids were treated for two hours with 17.5 g./hr. of HF at 400° C.

EXAMPLE 2

A mixture of tetrachloroethylene, chlorine and HF was passed over the catalyst and in the reactor of Example 1A in a mole ratio of $C_2Cl_4$/1–2 $Cl_2$/2.5–10 HF with contact times of 1–60 sec. About 10 sec. was found to be optimum. Product was collected in a condenser cooled in ice water; the major proportion of excess HF and product HCl did not condense. The condensed product was washed with dilute sodium hydroxide. Conversion was determined by vapor-phase chromatography of the product and isomer ratios by infrared analysis.

In the same manner, similar reactions were carried out using the catalysts of Example 1B, the chrome gel and Guignet's Green catalysts of Swamer and Howk, U.S. Pat. 3,258,500, and aluminum fluoride prepared by reaction of aluminum oxide with HF as described in German Pat. 1,224,732, Example 13.

The results are shown in Table I below.

The composition of the $C_2F_4Cl_2$ and $C_2F_3Cl_3$ fractions were as follows.

TABLE III

| Time, hours | Percent $CF_3CCl_3$ in $C_2F_3Cl_3$ | Percent $CF_3CFCl_2$ in $C_2F_4Cl_2$ |
|---|---|---|
| 13 | 1.9 | 14 |
| 76 | 2.5 | 16.4 |
| 81 | 1.5 | 16 |
| 83 | 0.3 | 14.3 |
| 91 | 0.4 | 11.5 |
| 339 | 0.5 | 12.5 |
| 362 | 0.3 | 12.7 |

EXAMPLE 4

Crude perchloroethylene obtained by the chlorination of ethylene and containing (as determined by area percent by vapor phase chromatography):

| | Percent |
|---|---|
| Carbon tetrachloride | 0.11 |
| Trichloroethylene | 1.4 |
| Perchloroethylene | 89.0 |
| Pentachloroethane | 0.27 |
| Hexachloroethane | 9.2 | was fed at 68 g./hr. along with HF at 35 g./hr. and chlorine at 35.5 g./hr. over the 20% $CrF_3$ on carbon of Example 1A in the reactor of Example 1A at 400° C. Off-gases were passed through an ice-cooled coil and the liquid which separated was washed acid free with

TABLE I

| Catalyst employed | Temperature (° C.) of reaction | Mole ratio of reactants $HF/C_2Cl_4/Cl_2$ | Time (sec.) of reaction | Conversion | Percent symmetrical isomer* |
|---|---|---|---|---|---|
| Example 1A | 400 | 4.3/1/1.2 | 5 | 1.4% $C_2F_4Cl_2$ | 43 |
| | | | | 44.5% $C_2F_3Cl_3$ | 97 |
| Example 1B | 400 | 4.3/1/1.2 | 8.7 | 11.9% $C_2F_3Cl_3$ | 98.8 |
| Guignet's Green | 200 | 4.3/1/1.2 | 7.0 | 14.5% $C_2F_3Cl_3$ | 98 |
| | | | | 32% $C_2F_3Cl_3$ | 97 |
| Do | 300 | 4.3/1/1.2 | 7.0 | 0.6% $C_2F_4Cl_2$ | 16 |
| | | | | 8.7% $C_2F_4Cl_2$ | 7 |
| Do | 400 | 4.3/1/1.2 | 7.0 | 42.4% $C_2F_3Cl_3$ | 81 |
| | | | | 0.46% $C_2F_4Cl_2$ | 32 |
| $AlF_3$ | 300 | 4.3/1/1.2 | 7.0 | 1.3% $C_2F_3Cl_3$ | 94 |
| | | | | 10.5 $C_2F_4Cl_2$ | 31 |
| Chrome gel | 200 | 4.3/1/1.2 | 7.0 | 41.6% $C_2F_3Cl_3$ | 93 |
| | | | | 31.7% $C_2F_4Cl_2$ | 24 |
| Do | 300 | 4.3/1/1.2 | 7.0 | 43.4% $C_2F_3Cl_3$ | 83 |

*Percent symmetrical isomer indicates the amount of product formed that is $CF_2ClCF_2Cl$ or $CF_2ClCFCl_2$.

EXAMPLE 3

The catalyst of Example 1C was placed in the reactor described in Example 1A, heated at 400° C. Then a mixture of 34 g./hr. tetrachloroethylene, 17.5 g./hr. HF and 29.1 g./hr. chlorine was passed over the catalyst. Samples were taken periodically for analysis by vapor-phase chromatography. After 77 hours, the temperature was lowered to 350° C. and after about 339 hours to 325° C. The run was terminated after a total of 536 hours. The results obtained are shown in Tables II and III below.

ice water containing KOH. Liquid composition by vapor phase chromatography was

| Component: | Mole percent |
|---|---|
| $C_2F_4Cl_2$ | 0.39 |
| $C_2F_3Cl_3$ | 10.5 |
| $CFCl=CCl_2$ | 0.78 |
| Unknown | 1.94 |
| $C_2F_2Cl_4$ | 45.7 |
| $C_2Cl_4$ | 22.9 |
| $C_2FCl_5$ | 17.1 |
| $C_2Cl_6$ | .78 |

The $C_2F_3Cl_3$ contained 1.6% $CF_3CCl_3$ and 98.4% $CF_2ClCFCl_2$

TABLE II

| Time of reaction (hrs.) | Temperature of reaction (° C.) | $C_2F_4Cl_2$ | $CF_2=CCl_2$ | $C_2F_3Cl_3$ | $CFCl=CCl_2$ | $C_2F_2Cl_4$ | $C_2Cl_4$ | $C_2FCl_5$ |
|---|---|---|---|---|---|---|---|---|
| 13 | 400 | 3.8 | | 41.1 | | 41.7 | 6.2 | 7.3 |
| 76 | 400 | 9.3 | | 41.7 | .87 | 18.5 | 28.4 | 1.2 |
| 81 | 350 | 9.4 | .43 | 39.3 | 2.1 | 4.1 | 37.2 | .4 |
| 83 | 300 | 1.3 | .16 | 39.1 | 1.5 | 26.6 | 28.0 | 3.3 |
| 212 | 328 | 2.6 | .37 | 42.1 | 1.1 | 22.5 | 28.8 | 2.6 |
| 339 | 325 | 5.1 | | 38.7 | .64 | 27.3 | 26.0 | 5.1 |
| 362 | 325 | 3.1 | .39 | 44.1 | 1.2 | 23.4 | 25.0 | 2.7 |
| 536 | 325 | 4.4 | .79 | 39.7 | 2.4 | 20.2 | 30.9 | 1.6 |

EXAMPLE 5

Seventy grams of 4–10 mesh activated carbon (Nuchar) was added to a solution of 42.8 g. of $CrCl_3 \cdot 6H_2O$ in 200 ml. deionized water. The water was removed in a 125° C. oven. The resulting catalyst was treated with 17.5 g. HF for 1 hr. at 400° C. in the Inconel reactor of Example 1A immersed in a molten "Hitec" salt bath.

Perchloroethylene was fed at 34 g./hr., chlorine at 16 g./hr. and HF at 17.5 g./hr. at 350° C. and a contact time of 10 sec. Off-gases were passed through a coil cooled in ice. Analysis of the liquid product showed:

| Component: | Mole percent |
|---|---|
| $C_2F_4Cl_2$ | 0.24 |
| $CF_2=CCl_2$ | Trace |
| $C_2F_3Cl_3$ | 19.9 |
| $CFCl=CCl_2$ | 4.6 |
| $C_2F_2Cl_4$ | 49.6 |
| $C_2Cl_4$ | 24.0 |
| $C_2FCl_5$ | 1.7 |

The $C_2F_3Cl_3$ contained 98% $CF_2ClCFCl_2$ and 2% $CF_3CCl_3$

EXAMPLE 6

(Non-useful catalysts)

(A) To 10 g. of $CrF_3 \cdot 4H_2O$ in 200 ml. water was added 120 g. of 8–14 mesh activated carbon (Gridler G–32H), a coconut carbon. The resulting mixture was dried in an oven at 120° C. and activated under nitrogen at 400° C./4 hours. To this catalyst in the reactor of Example 1A was fed perchloroethylene at 34 g./hr., chlorine at 29.1 g./hr. and HF at 17.5 g./hr. at 400° C. The reaction was run for two hours and recovered was 25.7 g. of liquid and 7.72 l. of gas when the off-gases had passed through an ice trip containing 10% KOH solution.

The liquid had the following composition (by vapor phase chromatography).

| Component: | Mole percent |
|---|---|
| $CFCl=CClF$ | 0.21 |
| $CF=CCl_2$ | 0.21 |
| $C_2F_3Cl_3$ | 1.5 |
| $CFCl=CCl_2$ | 16.2 |
| $CFCl_2CFCl_2$ | 39.6 |
| $C_2Cl_4$ | 40.9 |
| $C_2FCl_5$ | 1.5 |

It is noted that the amount of $C_2F_3Cl_3$ produced at 400° C. was very low (cf. catalyst 1B, Example 2).

(B) Seventy grams of coconut shell carbon was added to a solution of 42.8 g. $CrCl_3 \cdot 6H_2O$ in 200 ml. water and the mass evaporated to dryness in a 125° C. oven. The dried product was placed in the reactor of Example 1A immersed in a salt bath at 400° C. where it was treated with HF for two hrs. at a rate of 17.5 g. HF/hr.

The temperature of the bath was decreased to 325° C. and perchloroethylene fed at 34 g./hr., chlorine at 16 g./hr. and HF at 17.5 g./hr. After 1 hr. 10 min. there was recovered 59 g. of liquid and 1.67 l. gas.

The liquid had the following composition.

| Component: | Mole percent |
|---|---|
| $C_2F_3Cl_3$ | 1.2 |
| $CFCl=CCl_2$ | 9.3 |
| $C_2F_2Cl_4$ | 30.2 |
| $C_2Cl_4$ | 45.4 |
| $C_2FCl_5$ | 14.0 |

(C) Seventy grams of activated carbon (Columbia SA), a coconut carbon, was added to a solution of 42.8 g. $CrCl_3 \cdot 6H_2O$ in 200 ml. water. The mass was evaporated to dryness at 125° C. and the dried catalyst placed in the Inconel reactor of Example 1A immersed in a molten "Hitec" salt bath at 400° C. HF was passed over the catalyst for two hrs. at 17.5 g./hr.

The temperature was reduced to 325° C. and perchloroethylene was fed at 34 g./hr., chlorine at 16 g./hr. and HF at 17.5 g./hr. After two hrs. during which time the off-gases were passed through an ice trap, there was recovered 50 g. liquid and 3.64 l. gas. The product consisted of (by vapor phase chromatography).

| Component: | Mole percent |
|---|---|
| $C_2F_4Cl_2$ | 0.36 |
| $CF_2=CCl_2$ | .54 |
| $C_2F_3Cl_3$ | 24.7 |
| $CFCl=CCl_2$ | 8.0 |
| $C_2F_2Cl_4$ | 31.6 |
| $C_2Cl_4$ | 33.0 |
| $C_2FCl_5$ | 1.8 |

The $C_2F_3Cl_3$ contained 97.4% $CF_2ClCFCl_2$ and 2.6% $CF_3CCl_3$. It is noted that the 3 above catalysts do not produce either useful conversions or sufficiently low yields of $CF_3CCl_3$.

EXAMPLE 7

Comparison of the reactivity of chromium hydroxide fluoride-on-carbon and chromium fluoride-on-carbon (A) A $CrFe_3$-on-4/14 mesh activated carbon (Norit) was prepared by dissolving 42.8 g. of $CrCl_3 \cdot 6H_2O$ in 200 ml. water and adding thereto 70 g. of 4–14 mesh granular activated carbon. The water was removed in a 125° C. oven and the dried catalyst was placed in the reactor of Example 1A and heated at 400° C. for two hrs. in a stream of HF at a rate of 17.5 g./hr. To the reactor was then fed—

Perchloroethylene at 34 g./hr.
Chlorine at 16 g./hr.
HF at 17.5 g./hr.

at 285° C. and 325° C. Vapor-phase chromatographic analyses showed the following compositions of the de-acidified off-gases:

| Component | Mole percent | |
|---|---|---|
| | 285° C. | 325° C. |
| $C_2F_4Cl_2$ | 1.5 | 5.4 |
| $CF_2=CCl_2$ | 0.10 | .34 |
| $CF_2ClCFCl_2$ | 30.9 | 51.9 |
| $CFCl=CCl_2$ | .51 | .34 |
| $C_2F_2Cl_4$ | 39.7 | 21.8 |
| $C_2Cl_4$ | 22.7 | 13.6 |
| $C_2FCl_5$ | 4.6 | 1.4 |
| $CF_3CCl_3$ | [1] 0.3 | [2] 0.6 |

[1] 0.96% of total $C_2F_3Cl_3$.
[2] 1.1% of total $C_2F_3Cl_3$.

(B) A chromium hydroxy fluoride-on-4/14 mesh activated carbon (Norit) was prepared by dissolving 9.8 g. of $CrF_3 \cdot 4H_2O$ in 200 ml. deionized water at 70° C. A small residue remained undissolved under these conditions. To the solution was added 71.5 g. of the 4–14 mesh granular activated carbon. Water was removed by heating in a 125° C. oven and the dried catalyst heated in a stream of HF at 17.5 g./hr. at 300° C. for 4 hours.

To the catalyst in the reactor of Example 1A was added a mixture of—

Perchloroethylene at 34 g./hr.
Chlorine at 16 g./hr.
HF at 17.5 g./hr.

at 285° C. and 325° C. Vapor phase chromatographic analyses showed the following compositions in the deacidified off-gases:

| Component | Mole percent 285° C. | Mole percent 325° C. |
|---|---|---|
| $C_2F_4Cl_2$ | Nil | 0.44 |
| $CF_2ClCFCl_2$ | 2.7 | 22.6 |
| $CFCl=CCl_2$ | 5.0 | 3.5 |
| $C_2F_2Cl_4$ | 31.5 | 35.8 |
| $C_2Cl_4$ | 59.0 | 34.5 |
| $C_2FCl_5$ | 1.8 | 3.1 |
| $CF_3CCl_3$ | [1] 2.8 | [2] 0.7 |

[1] 51% of total $C_2F_3Cl_3$.
[2] 3% of total $C_2F_3Cl_3$.

It can be seen that the catalyst in part A, which was 20% $CrF_3$-on-activated carbon, was greatly superior to the catalyst 8% chromium hydroxy fluoride-on-activated carbon of part B when evaluated under the same conditions. The amount of chromium compound which could be adsorbed by the carbon was limited by the solubility of hydrated chromium fluoride in water. No such limitation is present in the catalyst $CrF_3$-on-activated carbon because of the high solubility of $CrCl_3 \cdot 6H_2O$ in water. On treatment with HF over an extended period, this latter material forms chromium fluoride.

EXAMPLE 8

Comparison of bulk catalyst prepared from $CrCl_3 \cdot 6H_2O$ and HF with bulk $CrF_3 \cdot 3H_2O$ (A) Powdered $CrCl_3 \cdot 6H_2O$ (42.8 g.) was placed in a 5.08 cm. diameter Inconel tube in a horizontal electric furnace. Heat was applied and when the temperature reached 60° C. the HF feed was started at 17.5 g./hr. After 50 min., the furnace reached 300° C. and for 4 hrs./300° C./HF was fed at the same rate as above. After cooling, a fluffy pink solid was discharged from the reactor. This catalyst was placed in the reactor of Example 1A and immersed in a salt bath at 350° C.

Perchloroethylene was fed at 1.1 g./g. catalyst per hour along with chlorine and HF in the ratio 1 $C_2Cl_4$/1.1 $Cl_2$/4.3 HF. Under these conditions there was produced 10.9% of $C_2F_3Cl_3$ in the reactor off-gas. Analysis of the $C_2F_3Cl_3$ fraction showed 97.5% $CF_2ClCFCl_2$ and 2.5% $CF_3CCl_3$.

(B) A powder prepared from 42.8 g. of $Cr_3 \cdot 4H_2O$ by heating at 200° C. overnight was placed in the Inconel reactor of Example 1A and evaluated as in part A except that the $C_2Cl_4$ was fed at 0.8 g./g. catalyst per hour with the ratio 1 $C_2Cl_4$/1.1 $Cl_2$/4.3 HF as before. At 350° C., there was produced 8.4% of $C_2F_3Cl_3$ in the product stream. Analysis of this fraction showed 96.2% $CF_2ClCFCl_2$ and 3.8% $CF_3CCl_3$.

EXAMPLE 9

(A) The catalyst of Example 7A (87 g.) was placed in the reactor of Example 1A. The reactor was immersed in a molten "Hitec" salt bath at 325° C. A mixture of 75% $C_2F_2Cl_4$ and 25% $C_2Cl_4$ was fed to the reactor at 71 g./hr., chlorine at 43 ml./min. and HF at 19.1 g./hr. Contact time was about 10 sec. After 2.3 hrs. of operation, the recovered deacidified liquid product had the following composition (mole):

| Component: | Mole percent |
|---|---|
| $C_2F_4Cl_2$ | 1.7 |
| $C_2F_3Cl_3$ | 56.0 |
| $CFCl=CCl_2$ | 1.7 |
| $C_2F_2Cl_4$ | 35.4 |
| $C_2Cl_4$ | 4.9 |
| $C_2FCl_5$ | 0.41 |

The $C_2F_3Cl_3$ fraction contained 99.7% $CF_2ClCFCl_2$ and 0.3% $CF_3CCl_3$.

(B) The catalyst of Example 7A (53.7 g.) was placed in the reactor of Example 1A and immersed in a salt bath at 350° C. A mixture of 86% $CFCl_2CFCl_2$ and 14% $CF_2ClCCl_3$ was fed at 60.3 g./hr. and HF at 12.0 g./hr. The contact time was about 10 sec. After 1.5 hrs. operation, the deacidified liquid product had the following composition.

| Component: | Mole percent |
|---|---|
| $C_2F_4Cl_2$ | 3.8 |
| $CF_2=CCl_2$ | 0.34 |
| $C_2F_3Cl_3$ | 43.8 |
| $CFCl=CCl_2$ | 1.3 |
| $C_2F_2Cl_4$ | 49.2 |
| $C_2Cl_4$ | 0.42 |
| $C_2FCl_5$ | 1.7 |

The $C_2F_4Cl_2$ fraction contained 11.7% $CF_3CFCl_2$ and 88.3% $CF_2ClCF_2Cl$. The $C_2F_3Cl_3$ fraction contained 99.8% $CF_2ClCFCl_2$ and 0.2% $CF_3CCl_3$.

(C) The catalyst of Example 7A (80 g.) was placed in the reactor of Example 1A and placed in a molten salt bath at 300° C. A mixture of 80% $C_2F_2Cl_4$ and 20% $C_2F_3Cl_3$ by weight was fed at 71 g./hr. and HF at 7.1 g./hr. for 2 hrs. The recovered deacidified organic liquid had the composition.

| Component: | Mole percent |
|---|---|
| $C_2F_4Cl_2$ | 5.0 |
| $CF_2=CCl_2$ | 0.21 |
| $C_2F_3Cl_3$ | 74.9 |
| $C_2F_2Cl_4$ | 17.3 |
| $C_2Cl_4$ | 0.68 |
| $C_2FCl_5$ | 1.8 |

The $C_2F_4Cl_2$ fraction contained 90% $CF_2ClCF_2Cl$ and 10% $CF_3CFCl_2$. The $C_2F_3Cl_3$ fraction contained 99.7% $CF_2ClCFCl_2$ and 0.3% $CF_3CCl_3$.

EXAMPLE 10

1,1,2 - trichloro - 1,2,2-trifluoroethane containing 0.1–0.2% by weight 1,1,1-trifluoro-2,2,2-trichloroethane was fed at a rate of 65.1 g./hr. along with 21 g./hr. of HF over the catalyst of Example 7A in the apparatus of Example 1A at 370° C. and one atmosphere. The reactor effluent was scrubbed with water, dried and collected in a refrigerated condenser. Analysis indicated a 40.2% conversion of trichlorotrifluoroethane. The dichlorotetrafluoroethane product consisted of 91.8% 1,2-dichlorotetrafluoroethane and 8.2% 1,1-dichlorotetrafluoroethane. The recovered trichlorotrifluoroethane consisted of 99.5% 1,1,2-trichloro isomer and 0.5% 1,1,1-trichloro isomer.

EXAMPLE 11

To the reactor of Example 1A containing 235 g. of catalyst of Example 7A was fed a mixture of 75% 1,2-difluorotetrachloroethane and 25% 1,1,2-trichloro-1,2,2-trifluoroethane at 1.46 lb./hr. and HF at 0.22 lb./hr. at a catalyst bed temperature of 375° C. and a reaction pressure of 250 p.s.i.g. (18 atm.). The product had the following composition:

$C_2F_4Cl_2$ 10.1% containing 14% $CF_3CFCl_2$, 86%

$CF_2ClCF_2Cl$ $C_2F_3Cl_3$ 68.6% containing 0.6% $CF_3CCl_3$
$C_2F_2Cl_4$ 19.5%
$C_2FCl_5$ 1.8%

EXAMPLE 12

To 600 ml. deionized water was added 183 g. of $CrCl_3 \cdot 6H_2O$. When solution was complete, 304.0 g. of 4-10 mesh activated carbon, which was a coke obtained from bituminous coal (Type BPL, Pittsburgh Activated Carbon Co.), was added slowly. The resulting slurry was dried at 125° C. with frequent stirring. The dried catalyst was loaded into the apparatus of Example 1A, heated at 300° C. and treated with 136 g. anh. HF over a period of 4 hours.

The temperature was raised to 350° C., and a mixture of 1,1,2-trichloro-1,2,2-trifluoroethane (33% by weight)

and 1,1,2,2 - tetrachloro - 1,2 - difluoroethane (67% by weight) was fed at 1215 g./hr. along with anh. HF at 45.6 g./hr. After 9 hrs., the product composition showed the following:

| | Percent |
|---|---|
| $CF_2ClCF_2Cl$ | 7.5 |
| $CF_2ClCFCl_2$ | [1] 71.2 |
| $CFCl_2CFCl_2$ | 7.9 |
| $C_2Cl_4$ | Trace |
| $CFCl_2CCl_3$ | Trace |

[1] Containing 0.25% $CF_3CCl_3$.

EXAMPLE 13

Carbon washing

A 500 ml. graduate was filled with the vegetable carbon of desired mesh size described below and water was pumped into the graduate through an internal tube extending to the bottom. The carbon was retained in the graduate by means of a screen and water was allowed to overflow the top. Over a period of 24 hours, 15 l. of water were pumped through the graduate and the excess water was drained from the carbon which was then dried in an air oven. Carbon samples were analyzed by X-ray fluorescence before and after washing.

Catalyst preparation and testing procedure

Both washed and unwashed carbon samples were converted to catalysts for testing by the following procedure: A solution of 610 g. chromium trichloride hexahydrate [$CrCl_3 \cdot 6H_2O$] in 2500 ml. deionized water was prepared. Then, 1000 g. of carbon of the proper mesh size were added and the mixture was slurried together. The resulting slurry was evaporated to dryness by heating in an air oven at 125° C., with frequent stirring during drying About 66 g. of the treated material obtained by air drying were placed in a 2.54 cm. x 76.2 cm. U-shaped Inconel tube, fitted at one end for admission of reactants and at the other end for removal and recovery of products. The U-shaped reactor was immersed in a high temperature salt bath. All of the catalyst was contained in the downstream leg of the U, the upstream leg acting as a preheater.

The chromium trichloride containing carbon was heated at 325° C. for three hours in a stream of anh. HF (17.5 g./hr.) and dry nitrogen (30 ml./min.). Catalyst preparation is then complete.

The activity of the catalyst was determined as follows: Maintaining the HF and nitrogen feeds from the catalyst preparation above at the same rates, admission of tetrachloroethylene (34 g./hr.) and chlorine (16 g./hr.) was initiated while maintaining the 325° C. temperature. The product stream exiting the U-shaped reactor was passed through cold 10% aqueous potassium hydroxide. The hydrogen chloride product and any excess HF and chlorine were consumed by the potassium hydroxide while the organic product collected as a water insoluble layer. After drying, the organic product was analyzed by vapor phase chromatography.

The nature of the carbons tested and their alkali metal content before and after washing are shown in Table IV. The results of the above catalytic activity test are shown in Table V.

TABLE IV

| Carbon name | Source | Before washing | After washing |
|---|---|---|---|
| Cliffchar [1] | Hardwood | 3.5 | 0.3 |
| Cliffchar (5% HCl washed) | | | 1.10 |
| G-32-H [2] | Coconut shell | 3.2 | 1.7 |
| B.C. type 570 [3] | Hardwood | 3.5 | 0.3 |

[1] Cliffs-Dow Chemical Co. [2] Girdler. [3] Barnebey-Cheney.

TABLE V

| Carbon | Temp., °C. | Mole percent product analysis CFCl= | | | | | |
|---|---|---|---|---|---|---|---|
| | | $C_2F_4Cl_2$ | $C_2F_3Cl_3$ | $CCl_2$ | $C_2F_2Cl_4$ | $C_2Cl_4$ | $C_2FCl_5$ |
| Cliffchar unwashed | 325 | Trace | 9.3 | 4.3 | 59.4 | 23.5 | 3.7 |
| Cliffchar washed | 325 | 3.4 | 70.8 | | 19.0 | 6.8 | Trace |
| Cliffchar 5% HCl washed | 325 | 2.2 | 66.0 | | 30.3 | | 0.93 |
| G-32-H unwashed | 325 | | 10.9 | | 74.8 | | 14.3 |
| G-32-H washed | 325 | Trace | 17.0 | 4.8 | 27.1 | 49.5 | 1.6 |
| B.C. type 570 unwashed | 350 | | 0.16 | 0.33 | 18.9 | 70.1 | 0.50 |
| B.C. type 570 washed | 325 | 1.5 | 41.0 | 3.5 | 18.3 | 35.8 | |

Identification of catalysts

The $CrF_3$ catalyst employed in this invention must be relatively pure, i.e., free of oxyfluorides. The X-ray data for $CrF_3$ is described by K. Knox, Acta. Cryst., 13, 507 (1960). Ruh and Davis, in U.S. Pat. 2,745,886, report that heating chromium fluoride hydrates such as $CrF_3 \cdot 3H_2O$, $CrF_3 \cdot 3\frac{1}{2}H_2O$, $CrF_3 \cdot 4H_2O$, $CrF_3 \cdot 6H_2O$, and $CrF_3 \cdot 9H_2O$ gives a basic chromium fluoride or chromium oxyfluoride. No X-ray or other data are given. However, J. M. Cowley and T. R. Scott, J. Amer. Chem. Soc., 70, 105 (1948) have reported such data for aluminum oxyfluorides.

Many of the catalysts described hereinbefore were found to be amorphous to both X-ray and electron diffraction, analogous to the situation when aluminum chloride is treated with HF (Calfee, Miller and Smith, U.S. Pat. 2,755,313). In two cases, however, crystalline $CrF_3$ was identified. One case resulted from deposition of $CrCl_3 \cdot 6H_2O$ on Columbia CXC carbon followed by activation at 400° C. with HF and nitrogen (see Example 1A), the $CrF_3$ being identified by X-ray diffraction. The other case was a catalyst prepared with 50% $CrCl_3 \cdot 6H_2O$ on Norit, treated with HF for 4 hours at 400° C., $CrF_3$ being identified by electron diffraction. In a third case, an originally amorphous catalyst was caused to crystallize to $CrF_3$. Thus, when bulk $CrCl_3 \cdot 6H_2O$ was heated at 400° C. for two hours with HF, the resulting material was amorphous. But, if it was then further heated at 700° C. for 4 hours in a helium stream, crystalline $CrF_3$ was identified by X-ray diffraction.

In many of these products, face centered cubic crystalline compounds were found having a lattice constant of 10.15 A., corresponding closely to the corresponding aluminum hydroxy fluorides. Since chemical analyses have shown materials prepared by dehydrating hydrous $CrF_3$ to approximate oxyfluorides, the 10.15 A. crystals are assured to be an oxyfluoride. The following were shown to contain this crystalline species.

(1) $CrF_3 \cdot 4H_2O$ on Columbia CXC carbon, after 400 hours' exposure to HF during use. X-ray and electron diffraction show both $CrF_3$ and $Cr(OH,F)_3$.

(2) Bulk $CrF_3 \cdot 3H_2O$ heated for 4 hours at 700° C. in nitrogen. X-ray shows both $CrF_3$ and $Cr(OH,F)_3$.

(3) $CrF_3 \cdot 4H_2O$ on Norit carbon, 400° C. in nitrogen. Electron diffraction shows $Cr(OH,F)_3$.

(4) Bulk $CrF_3 \cdot 3H_2O$ heated at 400° C. for 4 hours in nitrogen. X-ray shows $Cr(OH,F)_3$.

(5) Material No. 4 further heated 2 hours at 500° C. under helium. X-ray shows both $CrF_3$ and $Cr(OH,F)_3$.

(6) Bulk $CrF_3 \cdot 4H_2O$ heated under nitrogen for 2.5 hours at 500° C. X-ray shows $Cr(OH,F)_3$.

Catalysts having oxyfluorides as one component were not effective in the process of this invention.

The 1,1,2-trichloro-1,2,2,-trifluoroethane prepared by the process of this invention is useful as a refrigerant, solvent, cleaning agent and the like and is also used as an intermediate to prepare chlorotrifluoroethylene monomer. The 1,2-dichloro-1,1,2,2-tetrafluoroethane prepared by the process of this invention is useful as a refrigerant blowing agent for foams and aerosol propellant.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing compounds of the formula $CF_2ClCFXCl$ wherein X is fluorine or chlorine which comprises reacting substantially anhydrous hydrogen fluoride with a compound of the formula $C_2Cl_aF_b$ wherein $b$ is a cardinal number of 0 through 3 and is less than the total number of fluorine atoms in $CF_2ClCFXCl$, the sum of $a$ and $b$ is six, and the number of fluorine atoms in $C_2Cl_aF_b$ attached to the same carbon atom is no greater than two; at a temperature of between about 200° C. and 450° C. in the presence of a catalytic material selected from chromium trifluoride or chromium trifluoride on a supporting base of activated carbon derived from vegetable carbon having an alkali metal ion content of 0.3% or less by weight, petroleum carbon or coal carbon, and at a pressure which does not cause condensation of any of the reactants.

2. The process of claim 1 wherein the molar ratio of hydrogen fluoride to the chlorine to be replaced in $C_2Cl_aF_b$ is at least 0.5.

3. The process of claim 1 wherein $C_2Cl_aF_b$ is a mixture of $C_2Cl_5F$ and $C_2Cl_4F_2$.

4. The process of claim 1 wherein $C_2Cl_aF_b$ is $$CF_2ClCFCl_2$$

5. The process of claim 1 wherein $C_2Cl_aF_b$ is $C_2Cl_6$ prepared in situ from tetrachloroethylene and chlorine.

6. The process of claim 1 wherein the catalyst is bulk chromium trifluoride.

7. The process of claim 1 wherein the catalytic material is chromium trifluoride on a supporting base of activated carbon derived from a wood carbon, petroleum carbon or coal carbon.

8. The process of claim 7 wherein the activated carbon is derived from wood carbon.

9. The process of claim 8 wherein the activated carbon derived from wood carbon is washed with water until the alkali metal ion content therein is reduced to 0.3% or less by weight before use in said process.

10. The process of claim 1 wherein the chromium trifluoride employed is prepared by dehydrating $$CrCl_3 \cdot 6H_2O$$

followed by treatment with hydrogen fluoride at temperatures above 200° C.

11. The process of claim 1 wherein the temperature is between about 350° C. and about 400° C. and the reaction is carried out at a pressure of between about 15 to about 20 atmospheres.

References Cited

UNITED STATES PATENTS

| | | | |
|---|---|---|---|
| 2,110,369 | 3/1938 | Leicester | 260—653.7 |
| 2,407,129 | 9/1946 | Benning et al. | 260—653.7 |
| 3,294,852 | 12/1966 | Vecchio et al. | 260—653.7 |

DANIEL D. HORWITZ, Primary Examiner

U.S. Cl. X.R.

252—444; 260—653.6